(12) United States Patent
Tseng et al.

(10) Patent No.: US 8,133,455 B2
(45) Date of Patent: Mar. 13, 2012

(54) MICRO-FABRICATED STAMP ARRAY FOR DEPOSITING BIOLOGIC DIAGNOSTIC TESTING SAMPLES ON BIO-BINDABLE SURFACE

(75) Inventors: Fan-Gang Tseng, Hsinchu (TW); Ching-Chang Chieng, Hsinchu (TW)

(73) Assignee: National Tsing-Hua University (TW)

( * ) Notice: Subject to any disclaimer, the term of this patent is extended or adjusted under 35 U.S.C. 154(b) by 1021 days.

(21) Appl. No.: 12/006,939

(22) Filed: Mar. 27, 2008

(65) Prior Publication Data

US 2008/0207468 A1   Aug. 28, 2008

Related U.S. Application Data

(62) Division of application No. 09/892,014, filed on Jun. 25, 2001, now abandoned.

(60) Provisional application No. 60/213,986, filed on Jun. 25, 2000.

(51) Int. Cl.
*B01L 3/02* (2006.01)

(52) U.S. Cl. ........ 422/501; 422/502; 422/503; 422/504; 346/141

(58) Field of Classification Search .......... 422/501–504; D18/14–17, 55; 222/143; 346/141
See application file for complete search history.

(56) References Cited

U.S. PATENT DOCUMENTS

| | | | |
|---|---|---|---|
| RE30,562 E * | 3/1981 | Park | 435/287.2 |
| 6,284,113 B1 * | 9/2001 | Bjornson et al. | 204/453 |
| 6,368,562 B1 * | 4/2002 | Yao | 422/504 |
| 6,376,256 B1 * | 4/2002 | Dunnington et al. | 506/30 |
| 6,832,737 B2 * | 12/2004 | Karlsson et al. | 241/100 |
| 6,919,045 B1 * | 7/2005 | Berndt | 422/502 |
| 6,969,489 B2 * | 11/2005 | Freeman | 422/504 |
| 7,025,935 B2 * | 4/2006 | Jones et al. | 422/503 |
| 7,135,117 B2 * | 11/2006 | Kane | 210/650 |
| 7,371,325 B2 * | 5/2008 | Kane | 210/650 |
| 2004/0202581 A1 * | 10/2004 | Berndt | 422/100 |
| 2006/0103051 A1 * | 5/2006 | Staats | 264/297.2 |
| 2007/0110633 A1 * | 5/2007 | Sundberg et al. | 422/102 |

* cited by examiner

*Primary Examiner* — Brian R Gordon
(74) *Attorney, Agent, or Firm* — Bo-In Lin

(57) ABSTRACT

The present invention discloses micro-stamp array supported on a substrate comprising a plurality of micro-stamp sticks. Each of the micro-stamp sticks includes a micro-stamp-stick head having a channel opened through a central portion in each of the micro-stamp sticks. Each of the micro-stamp-stick heads is attached to a tapered guide tube surrounded by tapered guide-tube walls wherein the tapered guide tube is in hydraulic communication with the micro-stamp-head channel. The micro-stamp array further includes a filler chip that includes a filler reservoirs disposing on top of the tapered guide tubes, each of the filler reservoirs having a refill channel opened to the tapered guide tube for refilling the tapered guide tube and the channels.

10 Claims, 12 Drawing Sheets

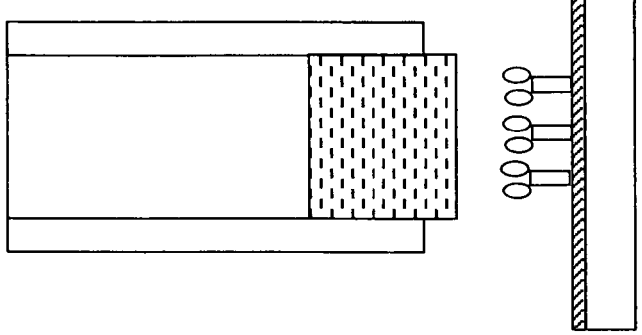
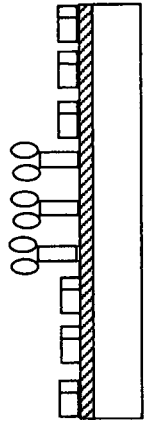
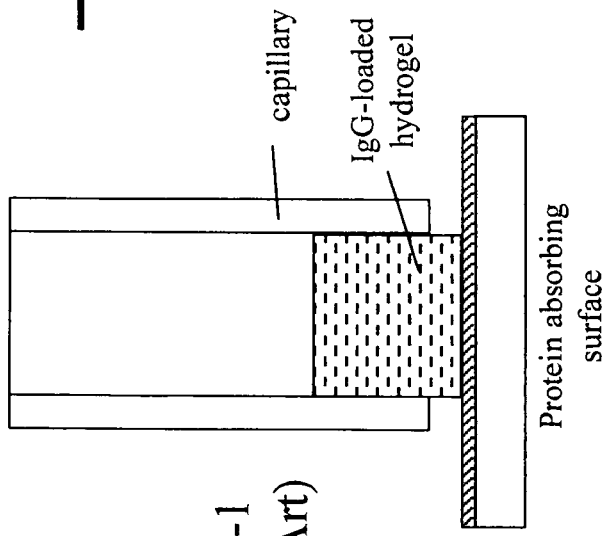
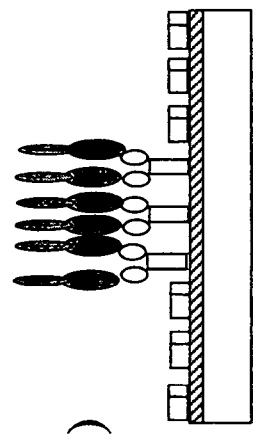

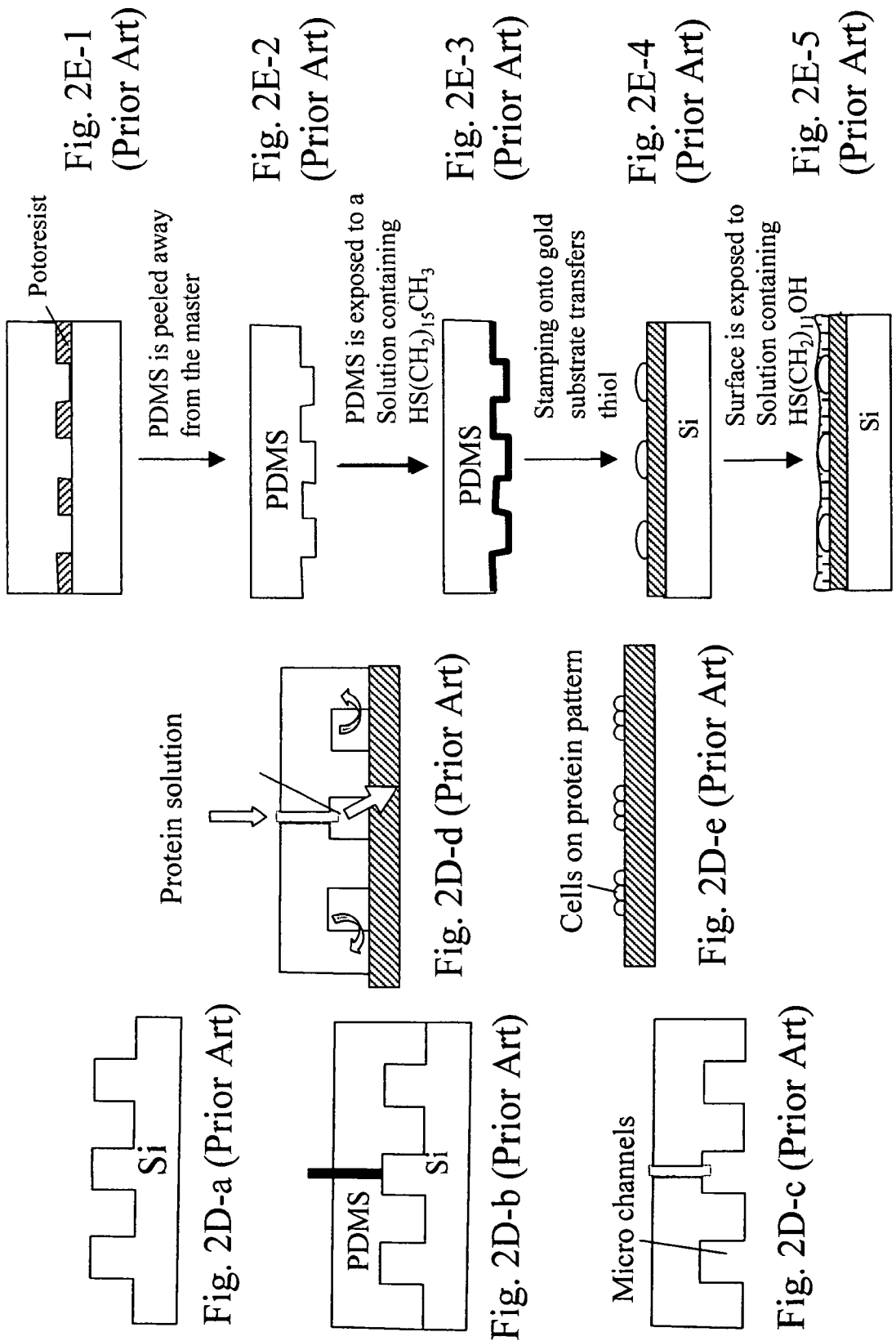

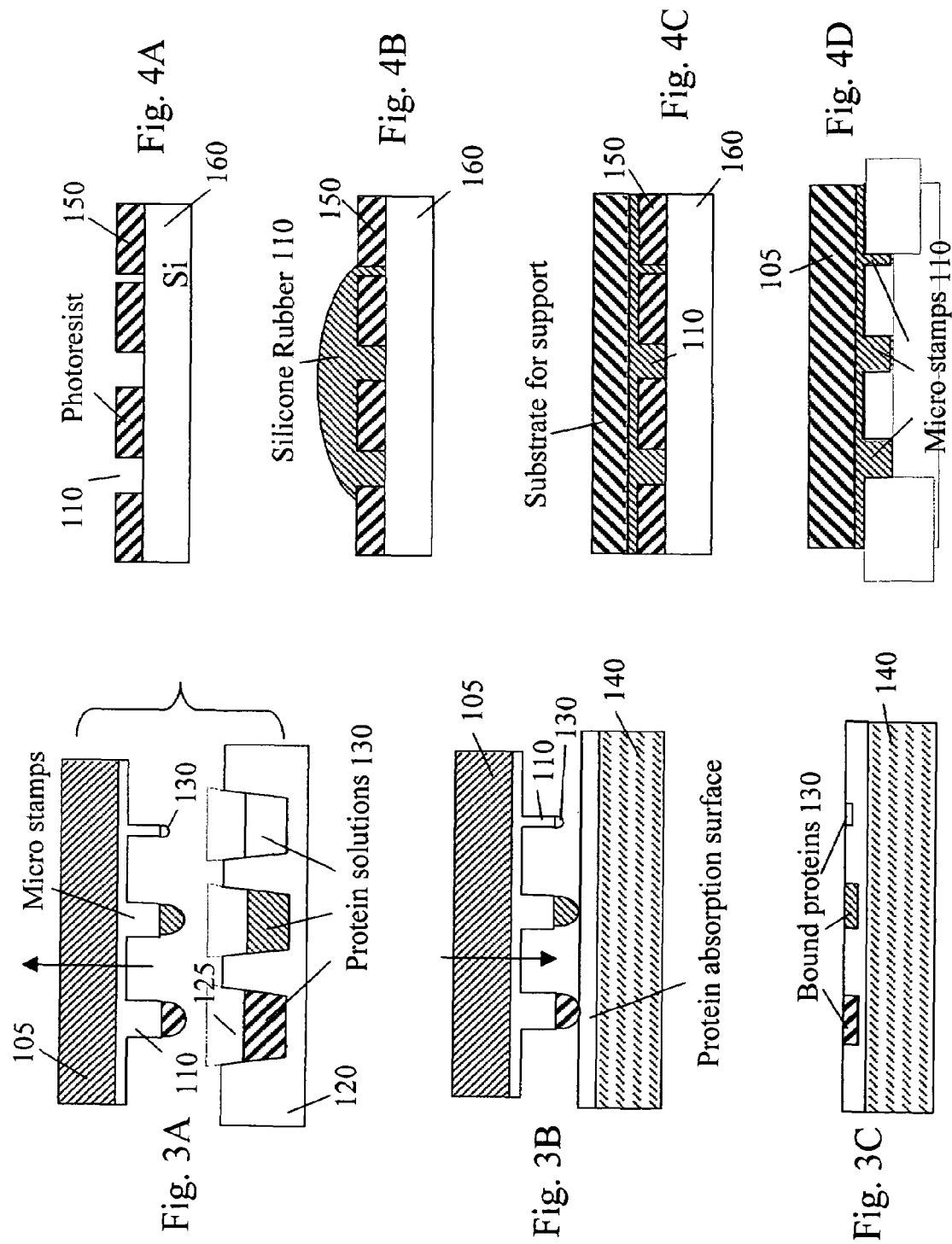

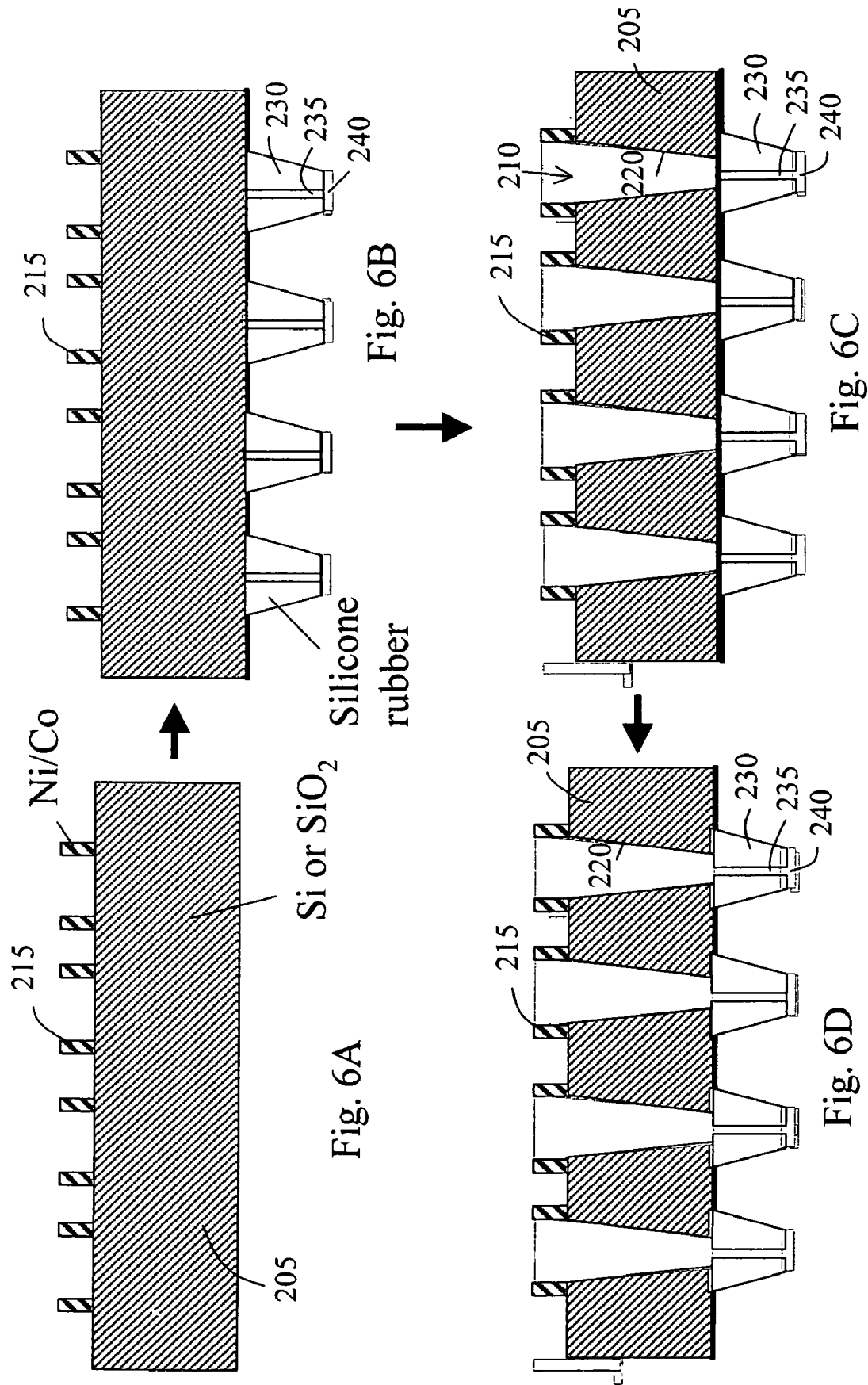

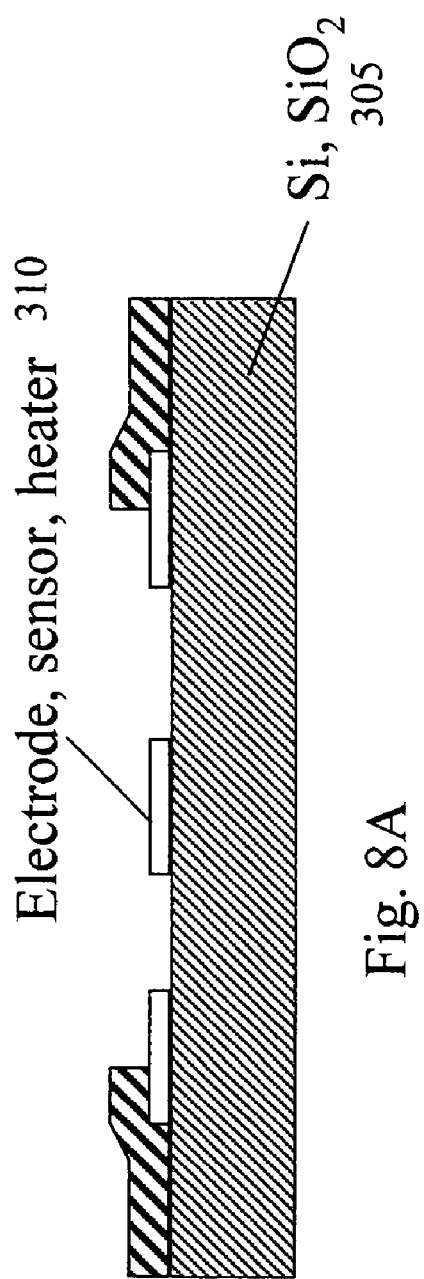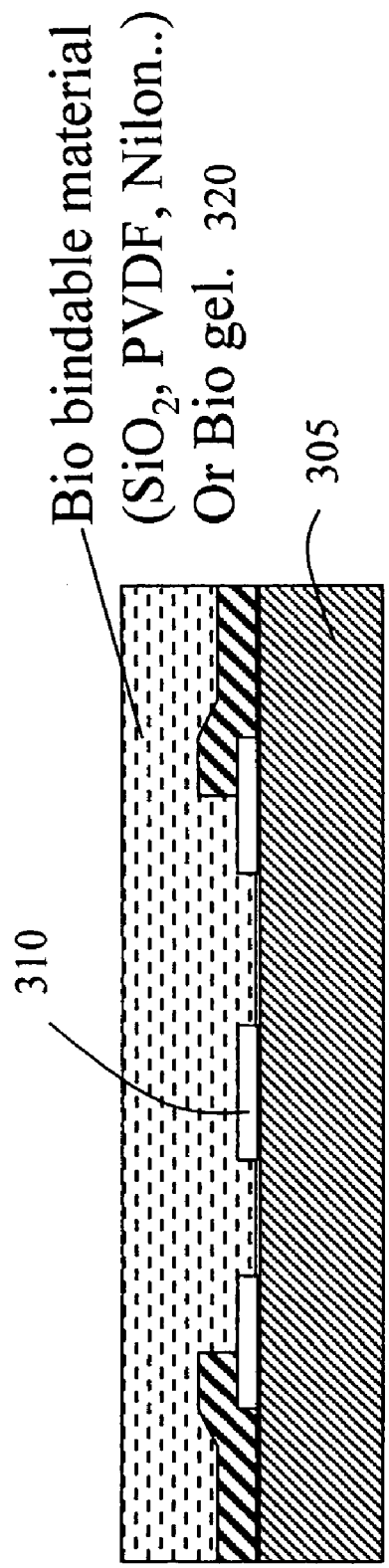

stamp

Not easy to contact with reaction substrate

Easy to contact with reaction substrate partial hydrophilic and hydrophobic surface as the left side; or the surface can be switched into hydrophilic or hydrophobic as desired Mixture drop Switchable surface (longitudinal, green means hydrophobic)

Inter channel valve cover
substrate

Proteins, DNAs...

Proteins inside small chambers

MICRO-FABRICATED STAMP ARRAY FOR DEPOSITING BIOLOGIC DIAGNOSTIC TESTING SAMPLES ON BIO-BINDABLE SURFACE

This Application is a Divisional Application of a Non-Provisional application Ser. No. 09/892,014 filed on Jun. 25, 2001, now abandoned and claims a Priority Filing Date of Jun. 25, 2000 benefited from a previously filed Application 60/213,986.

BACKGROUND OF THE INVENTION

1. Field of the Invention

This invention relates generally to apparatus and method for biologic reagent deposition. More particularly, this invention relates to apparatus and method for applying a micro-fabrication method for enabling high-speed deposition of large number of biologic reagent spots with low cost micro-fabricated stamps.

2. Description of the Prior Art

Several technical challenging difficulties are still confronted by those who apply conventional methods and apparatuses to form micro-arrays of biological samples on a support to perform analyses of a large number of biological reagents. The first challenge is the requirement to form a very large number of biological samples within a relatively short time to prevent over-evaporation or characteristic changes due to long time atmosphere exposure of the samples after micro array deposition. This requirement is often a limitation when analyses are performed on micro array consisted of more then ten thousands samples. Due to the sequential nature in dispensing a defined volume of liquid samples over the surface of a biological bindable surface, the deposition process may take more than one hour to complete even with the aid of computer controlled automation. Additionally, in order to obtain meaningful comparisons between the reactions among many deposited biologic samples on a biological bindable surface, the size and location for each of the biological samples must be precisely controlled. Several processes employed for depositing large number of biological samples in parallel experience greater degrees of random variations in sample sizes and are not very useful for practical applications. Beyond these difficulties, for purposes of biological sample testing, it is often desirable to deposit the biological samples of different sizes among the great number of biological samples. As the following brief review will clearly illustrate that current state of the art in making arrays of biological macromolecules, such as nucleic acid or proteins, do not have sufficient technical capabilities to satisfy all these requirements.

As discussed by D. J. Harrison, in "The Preface of the Proceedings of μTAS" (Banff, Canada, pp. Vii-viii, October 1998), the array-based system and the micro-fluid system are two major technologies employed for the analyses of a large number of biological reagents. One major task for such operation is to manipulate tiny amount of biological fluid. In the array-based technology, the biological samples or reagents are deposited in large arrays on a plate or chip for parallel biological processing and analyses. In the array-based technology, the quality of sample deposition plays a key role in determining the results of the biological analyses.

Brown et al disclosed in U.S. Pat. No. 5,807,522, entitled "Methods for Fabricating Micro-arrays of Biological Samples" (issued on Sep. 15, 1998), a method and apparatus for forming micro-arrays of biological samples on a support. As that shown in FIG. 1, the method involves dispensing a known volume of a reagent 16 at each selected array position by tapping a capillary dispenser on the support under conditions effective to draw a defined volume of liquid onto the support. The apparatus is designed to produce a micro-array of such regions in an automated fashion controlled by computer or microprocessors. Even with fully automatic control, this method is limited by a sequential nature of the sample dispensing processes that requires a longer period of time to complete the sample-deposition operations. The dispensing apparatuses and the micro-range movement machine and control processor are also very expensive and require high level of design and manufacture technologies to provide such devices and control system. As S. D. Rose discussed in the paper "Novel Tools for Creating and Reading DNA Microarrays" (Microdevices for Biomedical Applications, San Jose, Calif. April 1999), Brown's method takes at least one hour to spot over one chip with ten-thousand biological spots. And the system costs more than twenty-five thousand dollars ($25,000) for parts. The spots deposited with this method have about 20% size variation and if used for protein spotting, the spots may lose function to due sample drying out due to the long spotting cycle.

Other methods include photolithography (J. F. Mooney et al. "Patterning of Functional Antibodies and Other Proteins by Photolithography of Silance Monolayers" Proc, Natl. Acad. Sci. USA 93, pp 12287-12291, 1996, as shown in FIG. 2A-1 to 2A-3). Another paper presented a method of ink jet printing (D. Wallace et al. MHS'97, Nagoya, Japan, October 5-8, p 129, 1997 as shown in FIG. 2B-1 to 2B-4). B. Martin et al. disclosed a micro-stamping method ("Direct Protein Micro-Array Fabrication Using a Hydogel Stamper" (The American Chemical Society Journal of Surfaces and Colloids" Jul. 21, 1998, Volume 14, Number 15 as shown in FIGS. 2C-1 to 2C-4). Floch et al. (1998) and Y. Xia et al. (1996) disclosed a PDMS method as that shown in FIGS. 2D-a to 2D-e and FIGS. 2E-1 to 2E-5. All these methods encounter the difficulties that either the selection of sample types is limited, or having complexity on fabrication or operation processes thus become inconvenient or too expensive to be practically useful for large scale biological sample array analyses.

Therefore, a need still exists in the art of apparatus and operation techniques of biological sample deposition for a new and improved method to overcome these difficulties and limitations.

SUMMARY OF THE PRESENT INVENTION

It is therefore an object of the present invention to provide new techniques including materials and method for providing a device and operation process to enable the deposition of large number of biological samples. The apparatus and method enable a parallel process of deposition and utilizing a micro-fabricated stamp array to provide a device that can be manufactured at low cost while provide high precision and ease of operation configuration. With the novel micro-stamp array manufactured by the low cost manufacturing processes disclosed by this invention, a person of ordinary skill in the art is enabled to overcome the aforementioned difficulties and limitations encountered in the prior art.

Specifically, it is an object of the present invention to provide new methods of design and manufacture micro-stamps using micro-machining technologies for providing micro-stamp arrays, micro-reservoir arrays, micro-stamp array coupled with micro-channels and micro-channel sample filling chips, and micro-array sampling and testing chips at very low cost. These various micro-stamp arrays and associated chips for refilling and testing enable the performance of biological sample deposition and analyses to be performed at high speed and low cost while improve the processing precision in all the operations.

Another object of the present invention is to provide new methods of design and manufacture micro-stamps, micro reservoir arrays, micro channel refilling and micro sample sending and testing chips. These devices are manufactured at low cost using micro-machining technologies. The biological sample deposition and testing processes are carried out under normal temperature and pressure utilizing passive natural processes.

Briefly, in a preferred embodiment, the present invention includes a micro-stamp array supported on a substrate. The micro array includes an array of micro-stamp sticks substantially of a same stick length extending vertically from a surface of the substrate.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIGS. 2A to 2E are series of functional block diagrams show a variety of prior art system for performing biological sample deposition and tests;

FIGS. 3A to 3C are cross sectional view of the operation process of a micro-stamp array of this invention;

FIGS. 4A to 4D are cross sectional views for showing the process of making the micro-stamps;

FIGS. 6A to 6D are cross sectional views for showing the process of manufacturing the channeled micro-stamp array of FIG. 5;

FIGS. 8A to 8B are cross sectional views for showing the processes for manufacturing a sensor chip for performing biological analyses of this invention;

DETAILED DESCRIPTION OF THE PREFERRED EMBODIMENT

Figure 1:
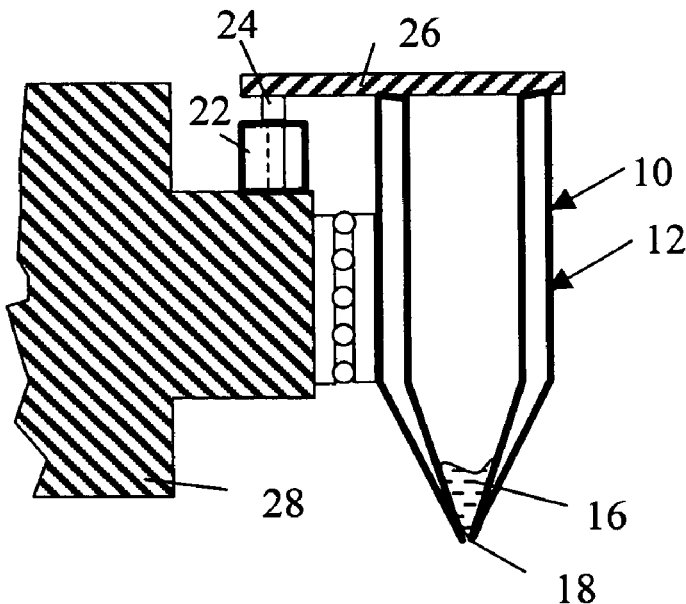
FIG. 1 is a functional block diagram showing a biological sample deposition system of a prior art.
Figures 1, 2A:
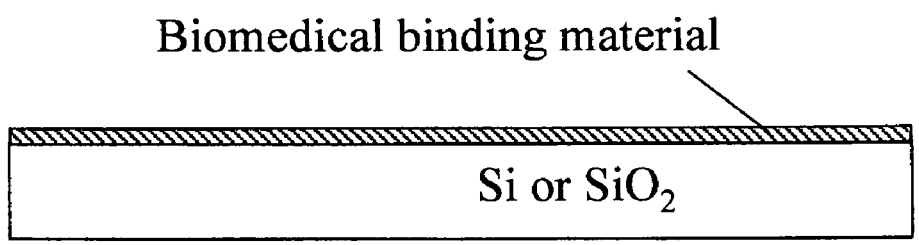
Figures 2, 2A:
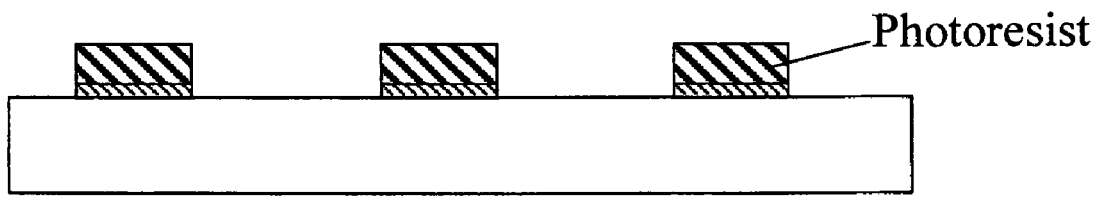
Figures 2, 2A, 3:
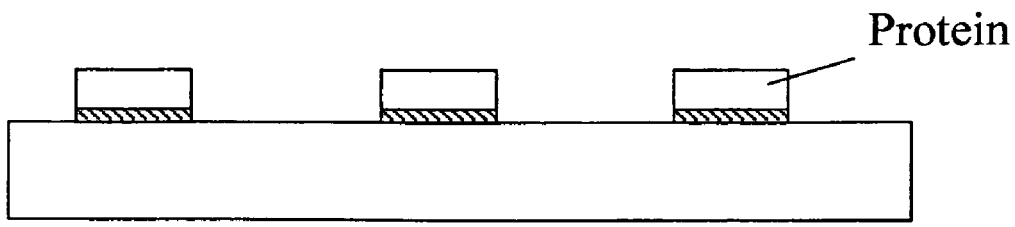
Figures 2, 2B, 3:
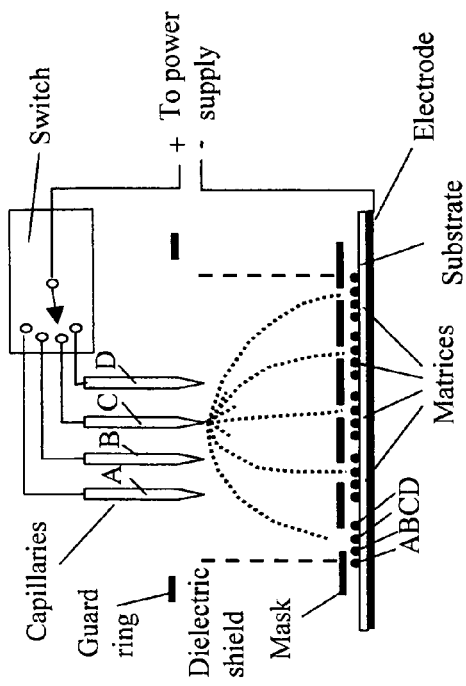

Please refer to FIG. 3A to 3C for a sequence of cross sectional views to show the basic concepts of this invention to resolved the difficulties faced by the prior art technologies. The biological-reagent deposition apparatus includes a micro-stamp array 100 formed on a silicon substrate 105. The micro-stamp array further has a great number of micro-stamps 110 formed as elongated micro-stamp-sticks extended from a front surface of the silicon substrate 105. Each of these elongated micro-stamp-sticks 110 has about a standard length that can have a range of one to few millimeters depending on applications that will be further discussed below. As shown in FIGS. 3A to 3C, these micro-stamp-sticks may be substantially elongated cylindrical stamp-sticks or may be formed as a square shaped sticks. Each of these micro-stamp-sticks 110 may have various diameters or sizes approximately few hundred micrometers (μm) to form deposition spots of different sizes depending on biological analyses intended for each of these deposition spots. As shown in FIG. 3A, the micro-stamp-sticks 110 supported on the substrate 105 is lowered into a reservoir array 120 that has a large number of micro-reservoirs 125 each holds a portion of biological samples 130. In contacting the biological samples 130 stored in the micro-reservoirs 125, the micro-stamp-sticks 110 draw a small quantity of the biological sample 130' onto the tips of these micro-stamp-sticks 110 through surface tension. In FIG. 3B, the micro-stamp-sticks 110 are then pressed onto a biological sample binding substrate 140. In FIG. 3C, the small amount of biological samples 130' are absorbed into the binding substrate 140 to form a micro-array of biological deposition spots 130" and ready for further biological analyses defined for each of these deposition spots 130".

Figures 2, 2B, 3, 4:
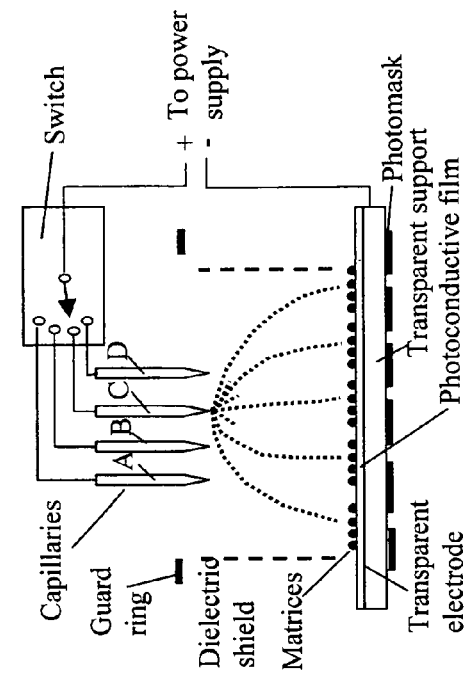
Figures 1, 2B:
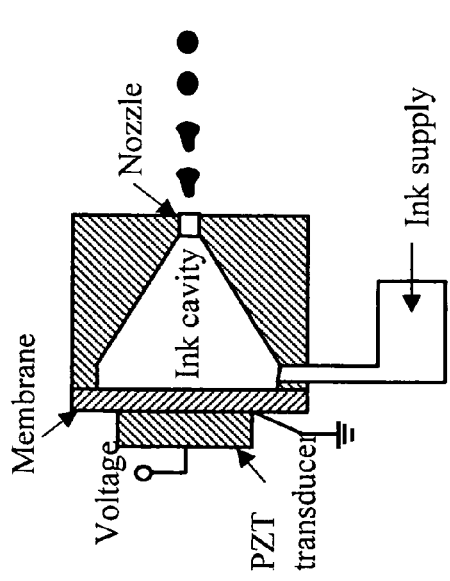
Figures 2, 2B:
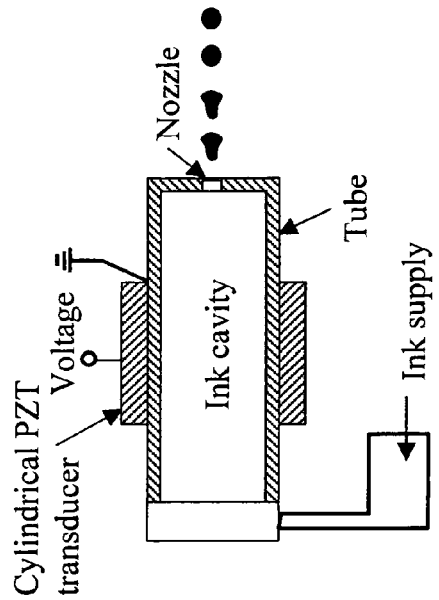

Referring to FIGS. 4A to 4D for a series of cross sectional views for showing the steps of making the micro stamp array 100. The processes started with depositing a photoresist layer 150 on top of a bottom silicon substrate 160. The photoresist layer 150 has a plurality of openings 110" employed as a micro-stamp mold. A silicon rubber 110' is deposited on top of the photoresist layer 150 (FIG. 4B). Then a supporting silicon substrate 105 is placed on top of the liquid silicon rubber 110'. The supporting silicon substrate 105 is pressed down onto the silicon rubber 110' with the liquid silicon rubber filled the openings 110" of the photoresist layer 150. The supporting silicon support 105 is pressed on top until the silicon rubber 110' is cured. A plurality of micro-stamp-sticks 110 are formed by the portion of silicon rubber 110' that fill in the openings of the photoresist layer 150 (FIG. 4C). The micro-stamp mold comprising the bottom silicon substrate 160 together with the photoresist layer 150 is then removed to complete the fabrication of the micro stamp array 100 with a plurality of micro-stamp-sticks 110 extended from the supporting silicon substrate 105 (FIG. 4D). As discussed above, the micro-stamp sticks can have diameter in the ranges of from tens to few-hundred micrometers depending on the requirements on the size of the biological samples.

Figure 5:
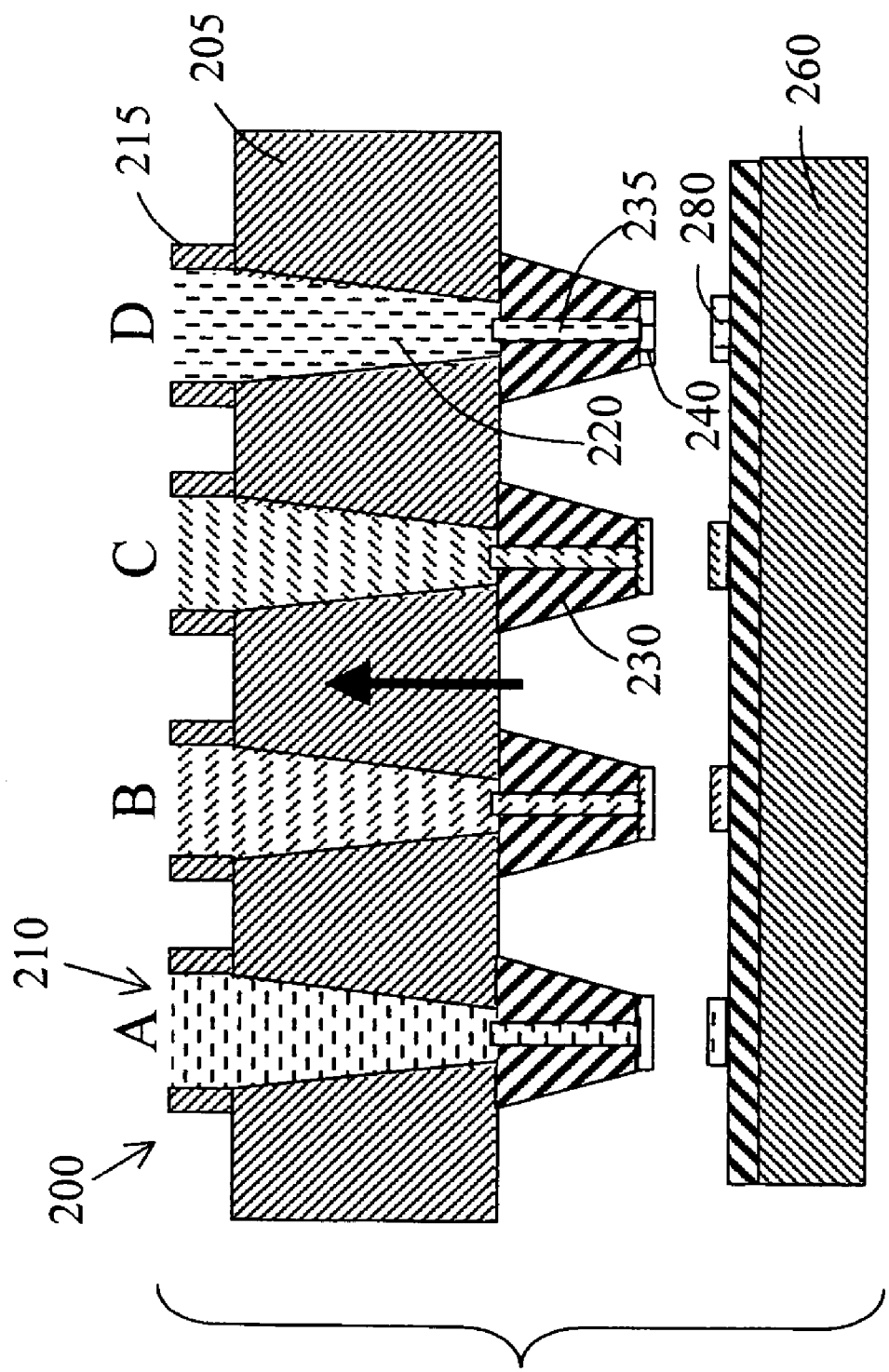
FIG. 5 is cross sectional view of a channeled micro-stamp array of this invention.

FIG. 5 is a cross sectional view of another micro-stamp array 200 for depositing great number of biological samples spots on bio-bindable testing pads 280 on a support substrate 260 of this invention. The micro-array stamp 200 is formed on a supporting substrate 205 opened with a plurality of micro-stamp channels 210. Examples of these micro-stamp channels 210 are shown as A, B C, and D. Each of these micro-stamp channels includes a micro channel entry surrounded and defined by a guide tube wall 215 for guiding a biological sample to flow into a tapered micro channel 220 that penetrates through the supporting substrate 205. Each micro channel stamp further includes a channeled stamp head 230 extended from the bottom of the supporting substrate 205 with a stamp-head micro channel 235 opened in the center portion. The stamp-head-micro channel 235 opened in each of channeled stamp heads 230 has the top opening in hydraulic connection with the tapered channel 230. The biological sample "poured in" from the channel entry, defined by the guide-tube wall 215 disposed on top of the supporting substrate 205, flows through the tapered channel 220 to flow down to the channeled stamp head 230 in the micro channel 235. The lower end of the micro channel 235 is sealed with a thin breakable membrane 240. As the micro stamp array 200 pressed onto the bio-bindable testing pads 280, the thin-breakable membranes are broken and the biological sample then deposited on the testing pads 280 supported on the test support substrate. An array density of more than ten thousands channeled stamp heads 230, e.g., a (100×100) array, can be formed per square centimeter (cm$^2$). The channeled stamp head can be formed with a size ranging from ten to one hundred micrometer (μm) in diameter by using compliant material. By simply pressing the micro array stamp to the substrate 260, the process of depositing a micro array of ten thousand (10,000) sample-spots can be completed within one minute. Biological samples with a volume of 100 Pico-liter can be deposited each time for stamping more than 2500 chips for biological analyses. The dead volume deposited on the testing chip supported on the chip 260 is less than one nl.

According to above descriptions, this invention discloses a micro-stamp array supported on a substrate. The micro array includes an array of micro-stamp sticks substantially of a same stick length extending vertically from a surface of the substrate. In a preferred embodiment, the micro-stamp sticks are channeled sticks for storing liquid biological sample therein.

FIGS. 6A to 6D are cross sectional views for showing the processes used to fabricate the micro stamp array 200. A support silicon substrate 205 is first plated and patterned to form a plurality of guiding tube-walls 215 for defining the channel entries for opening the micro channels 210. The plated layer may be formed with a layer of nickel or chromium. A layer of liquid silicon rubber is molded at the bottom surface of the to form the channeled micro-stamp head 230 at the bottom surface of the substrate 205 opposite the channel entries formed on the top surface (FIG. 6B). A deep reactive isotropic etching (RIE) or wet etching is applied to form a plurality of tapered micro channels 220 penetrating through the substrate 205 (FIG. 6C). The residue of silicon rubber is removed to open the channel stamp connection (FIG. 6D).

Special attention is paid to the shape and size of the micro channels such that the biological samples when stored in the micro channels 210 would stay in an equilibrium state. The surface tension between the channel surface and the liquid in each micro-channel generate a force balanced with the gravity force to maintain the liquid in the channel not to flow downward or pulled upward by the surface tension. More detail of such analyses is carried out by noting that surface tension force plays an important role on microchannel flows and it directly relates to the contact angle of liquid on solid. Hydrophobic or hydrophillic solid surface yields the contact angle larger or smaller than 90°. Therefore, the movement of a liquid slug inside a microchannel experiences different forces balance and the changing shape of the liquid slug is in different pattern especially if there is any irregular shape inside the microchannel. For example, in many biomedical applications, a micro-channels as that shown in FIG. 5 can serve the purpose as a temporary micro-reservoir for maintaining the liquid slug in the micro-channels. The sizes and shapes of the channels can be designed to achieve such purposes by taking into consideration of the surface tension and the gravity force asserted on the liquid inside each of these micro-channels and the face that the surface is hydrophobic or hydrophillic. The governing equations consist of equations for a scale function F, conservation of mass and momentum. Brief discussions are given below.

A scalar function F is defined as the fractional volume of the computational cell occupied by the fluid. The averaged value of F represents the phase state and fraction in the cell, i.e., F=1 if computational cell is fully occupied by the fluid, F=0 if the cell is fully occupied by the gas, and F is between 1 and 0 at the cell containing an interface. Under the assumption of incompressibility, the volume fraction F obeys the continuity equation:

$$\frac{\partial F}{\partial t} + \vec{U}_m \cdot \nabla F = 0 \quad (1)$$

Solving volume fraction equation accurately is the key preserving the sharpness of interface. However, due to the topology and numerical consideration, equation (1) is integrated with control volume, $V^F = \int F dV$, and discretized in time as follows:

$$V^{F,n+1} - V^{F,n} + \Sigma \delta V^{F,n} = \int \delta t (\nabla \cdot {}^\mu U_m) dV^F \quad (2)$$

The volume fluxes, $\delta V^F = {}^\mu U_m \cdot A^F \delta t$, estimated from the geometry of control volume, is the main feature of the VOF.

Continuity Equation $$\frac{\partial \rho_m}{\partial t} + \nabla \cdot \left( \rho_m \vec{U}_m \right) = 0 \quad (3)$$

Momentum Equation $$\frac{\partial \rho_m U_m}{\partial t} + \nabla \cdot \left( \rho_m \vec{U}_m \vec{U}_m \right) = -\nabla P + \rho_m \vec{g} + \nabla \cdot \left( \mu_m \nabla \overline{U}_m \right) + \vec{F}_{sv} \quad (4)$$

${}^\mu F_{sv}$ in Eq (4) is the volumetric surface tension force which can be calculated by CSF (Continuum Surface Force) model [5,8]:

$${}^\mu F_{sv} = {}^\mu f_{sv} \delta_s \text{ and}$$

$${}^\mu f_{sv} = \sigma \kappa \vec{h} + \nabla_s \sigma \quad (5)$$

where ${}^\mu f_{sv}$ is the surface tension per unit interfacial area, $\delta_s$ is the surface data function, $\sigma$ is the surface tension coefficient, $\kappa = -\nabla \cdot \vec{h}$ is the curvature of interface, and $\vec{h}$ is the unit normal vector.

PLIC-VOF Interface Tracking Methodology [5,9]

The interface equation of each computational cell is given by:

$$\vec{r} \cdot \vec{h} - c = 0 \quad (6)$$

where $\vec{r}$ is the locus of the interface and c is the constant prescribing the interface. At any point, $\vec{r}_0$ in the cell is sorted into three regions by the interface equation:

$$\vec{r}_0 \cdot \vec{h} - c \begin{cases} > 0 & \text{for } \vec{r}_0 \text{ behind interface} \\ = 0 & \text{for } \vec{r}_0 \text{ on interface} \\ < 0 & \text{for } \vec{r}_0 \text{ front interface} \end{cases} \quad (7)$$

The unit normal vector, estimated from volume fraction gradient $$\vec{n} = \frac{\nabla F}{|\nabla F|},$$

is the important key for the accuracy of interface tracking algorithm. The least square gradient that minimize the sum of square Taylor serial expansion of volume fraction minus other neighborhood volume fraction, $$\min\left[\sum_{nb}(F_P^{TS} - F_{nb})^2\right],$$

is applied to achieve second order accuracy of calculating $\nabla F$ in space. For a given constant c, the truncation volume that the fraction of cell volume truncated by interface can be derived from the interface equation Eq. (6) by a complicate geometric manipulation. However, the constant c is approximated by equivalent the truncation volume to the volume fraction of the cell. An iteration procedure of c is required for resolving the interface location that reconstructed the interface from the volume fraction of the cell. Once the interface is depicted, the volume fluxes and the integrated of volume fraction in Eq. (2) can be calculated with the time marching technique. Numerical analyses and simulation for specific configurations of these channels can be carried out for the design of the micro-channels to achieve an equilibrium state inside each channel.

Figure 7A:
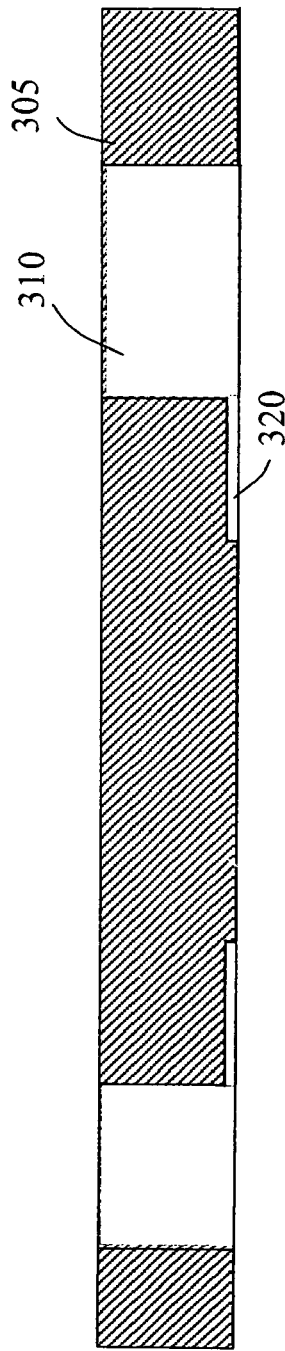
FIGS. 7A to 7C are cross sectional views for showing the processes for manufacturing a refilling kit for the channeled micro-stamp array of this invention.
Figure 7B:
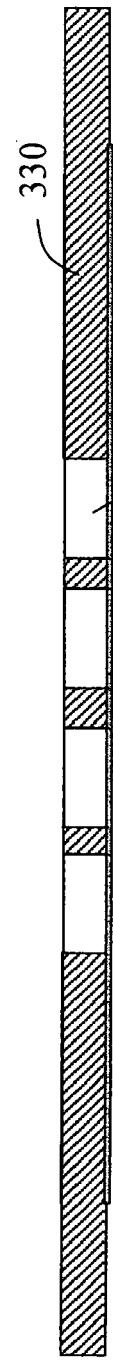
Figure 7C:
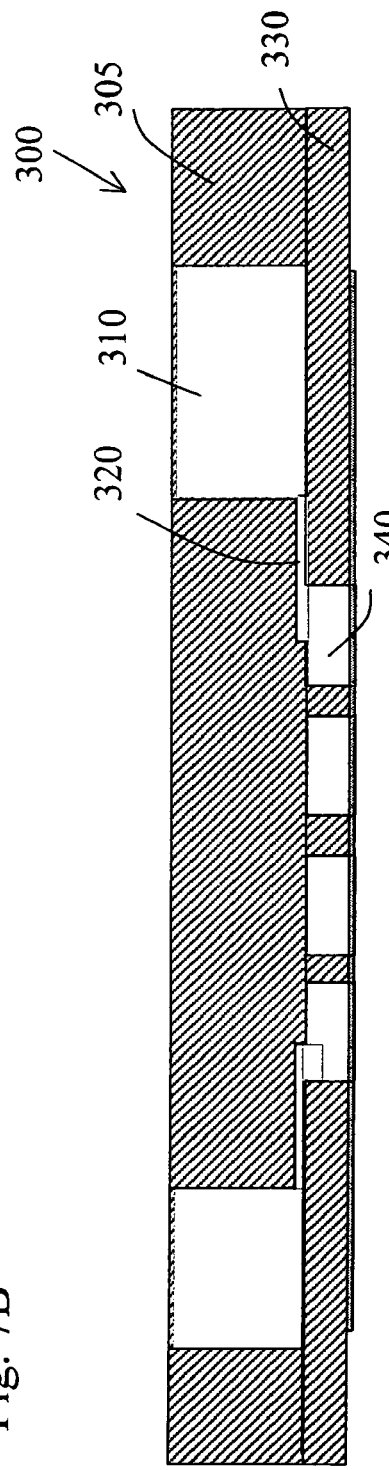

FIG. 7A to 7C are cross sectional views for showing a manufacture process for making a refilling kits for filling the micro-channels as that shown in FIG. 5. In FIG. 7A, a glass substrate 305 is etched to form the primary refilling reservoirs 310 and the refilling micro-channels 320. In FIG. 7B, a deep RIE is applied to s silicon rubber molding silicon substrate to form a plurality of secondary refilling reservoirs 340. The substrate 330 formed with the secondary refilling reservoirs are then bonded to the substrate 300 by employing a wafer bonding process to form the micro-channel refilling kit 300. FIGS. 8A and 8B shows the manufacture processes for making biological sensing microchips. In FIG. 8A, the electrode, sensor and heater pads are formed on a silicon or silicon dioxide substrate 405. In FIG. 8B, a biological bindable material layer 320 such as SiO2, PVDF, or Nilon or Bio-gel are coated over the substrate 305.

Figure 9A:
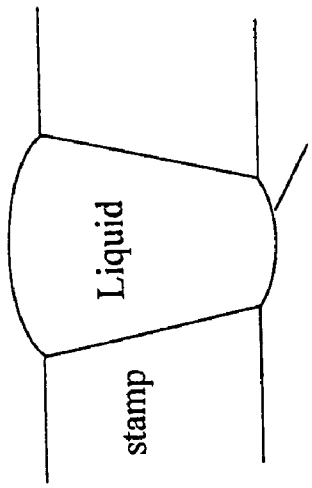
FIGS. 9A to 9D are cross sectional views of different shapes of a volume of liquid held in the micro-channels during the filling and stamping processes of this invention.
Figure 9B:
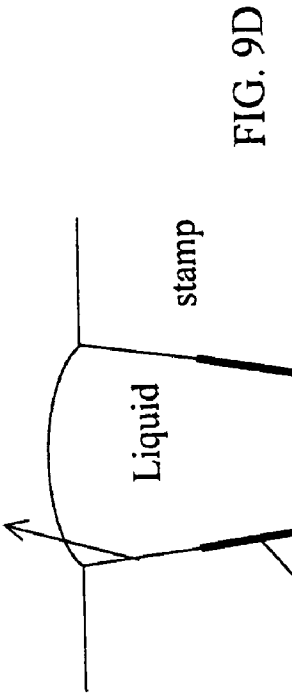
Figure 9C:
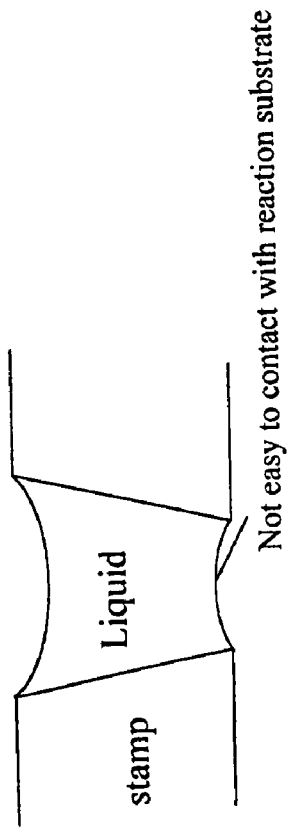
Figure 9D:
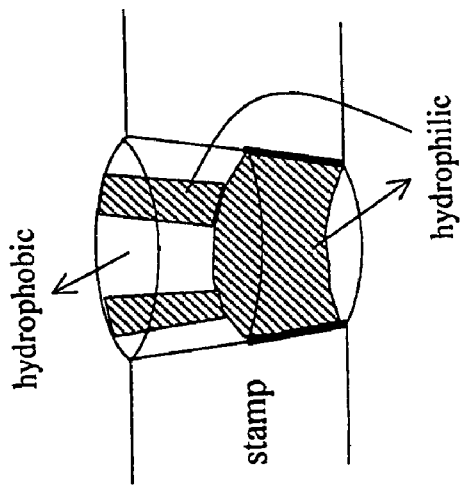

Referring to FIG. 9A to 9D for illustrating an invention related to micro stamp system by using surface tension force to drive liquid in the process of liquid filling into stamp or the stamping. The process using passive methods rely on only fluidic properties instead of active components like pumps or valves. The new design is related to the processes of filling and stamping. The filling process has two important aspects: (1) easy for liquid to fill in (the inner surface of stamp desires hydrophilic as that show in FIG. 9A). And, (2) the meniscus of liquid is concave downward for liquid easy to contact with the reaction surface, (the inner surface desires hydrophobic as that shown in FIG. 9B). To incorporate the above two concepts together, the inner surface of micro-channels, e.g., micro-channels 220 and 235 in FIG. 5, of the stamp need to be treated with partially hydrophilic and partially hydrophobic as shown in FIG. 9C. AS shown in FIG. 9C, the shadowed hydrophilic strips on the hydrophobic top surface can all the liquid to more easily flow down to the bottom hydrophilic surface of the stamp. In the meantime, the top hydrophobic part provides a positive pressure on the bottom liquid meniscus to make the surface extrude thus make the surface easy to contact with reaction substrate. Employing particular designed and manufactured strips on the inner surface of the micro-channels, the inner surface of the micro-channels can be made as switchable surface. The switch surface can achieve the dual functions that in filling process the inner surface of the micro-channel function as a hydrophilic channel. As shown in FIG. 9D, in the process of stamping onto a biological bindable substrate, the inner surface of the micro-channels is switched to become the hydrophobic The switch of the inner-surface of the micro-channels can be activated by thermal, electric, magnetic, optical, mechanical, thermal-hydraulic or other surface changing mechanisms.

The key for the stamping process is the control of the deposited liquid volume without variation for different depositions. The way to do this is when contacting with the reaction substrate with hydrophilic surface, the bottom of the stamp form micro chamber with the reaction substrate, thus liquid can flow until is stopped by the stamp boundary. This takes place regardless of the fact that the stamp outside surface is hydrophobic or hydrophilic, because the sharp corner of the stamp stops the liquid. The surface tension force decides the liquid volume deposited onto the reaction surface, thus precisely control the volume. Special strips for of different surface tensions formed on the inner surface of the micro-channels are designed and manufactured to provide pre-determined liquid volume for depositing onto the substrate.

Figure 10A:
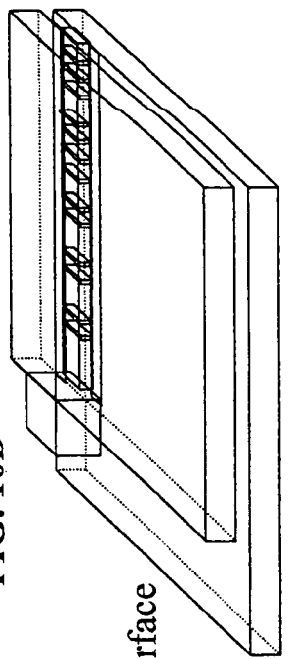
FIGS. 10A to 10F are perspective views for showing a two-dimensional sample separation device for separating samples from mixture drops.
Figure 10D:
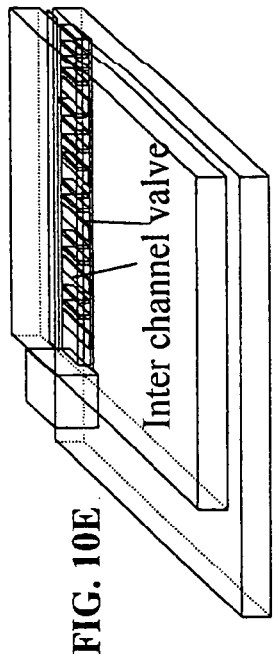
Figure 10E:
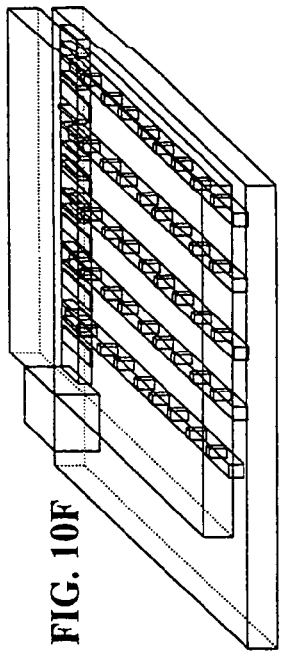
Figure 10B:
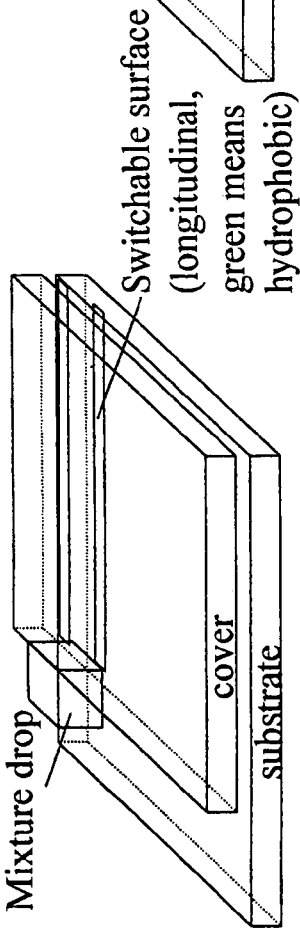
Figure 10C:
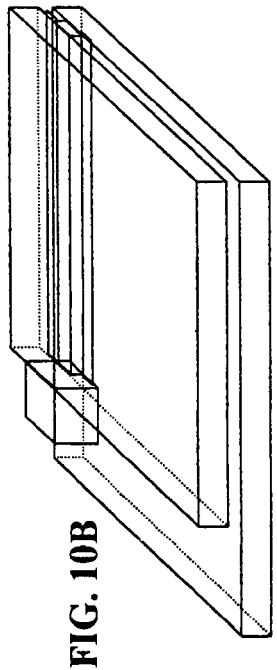
Figure 10F:
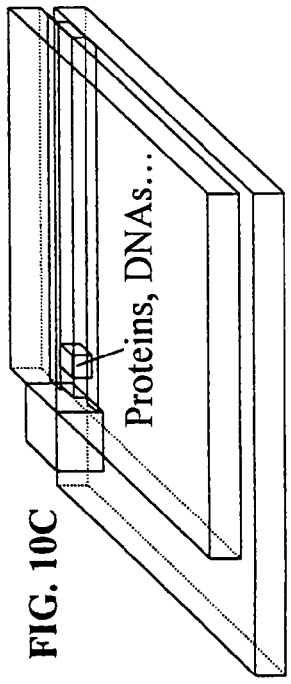

Referring to FIGS. 10A to 10F for a two-dimensional separation chip of this invention to prepare the protein samples. As shown in FIG. 10A, a drop of blood from human body, after filtering out cells inside blood, the liquid mixture is deposited into the 2D-separation chip for protein separation by different molecular weights. The mixture drop is first piped onto the chip entrance, and then the surface tension force takes the liquid mixture into longitudinal micro channel automatically as that shown in FIG. 10B. The separation chip is fabricated by bonding a cover onto a substrate, and the flow channels are formed by switchable valves which are only thin film patterned on the substrate and cover inner surface. By using electrostatic force, the protein samples can be refocused back into the channel entrance region (FIG. 10C). The following electrostatic field can then drive protein flow through the longitudinal channel for coarse separation (preferably, not limit to, 100 different protein section as shown in FIG. 10D. The inter channel valves (can be driven by electrostatic, thermal, surface chemistry, surface roughness, etc., change the surface properties of the surface into hydrophobic on which liquid mixture staying on, thus break up long liquid slug into various smaller slugs (FIG. 10E). After the switch off the longitudinal switchable channel valve, the separated liquid slug can then fill into the transverse liquid channel (FIG. 10F), and perform the second fine-protein-separation by capillary electrophoresis again, with preference of 100 different samples. After the second separation process, the proteins in one drop of blood can be separated into 10,000 different protein samples. The switchable valves are then turned to hydrophobic to separate liquid sample on transverse slugs into smaller liquid slugs (now 10,000 slugs, not shown in the figure).

Figure 11B:
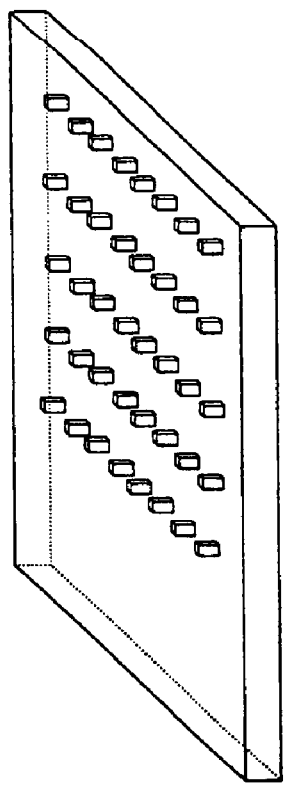
FIGS. 11A to 11C are perspective views, for showing further processes of the separated samples generated by the two dimensional sample separation device.
Figure 11C:
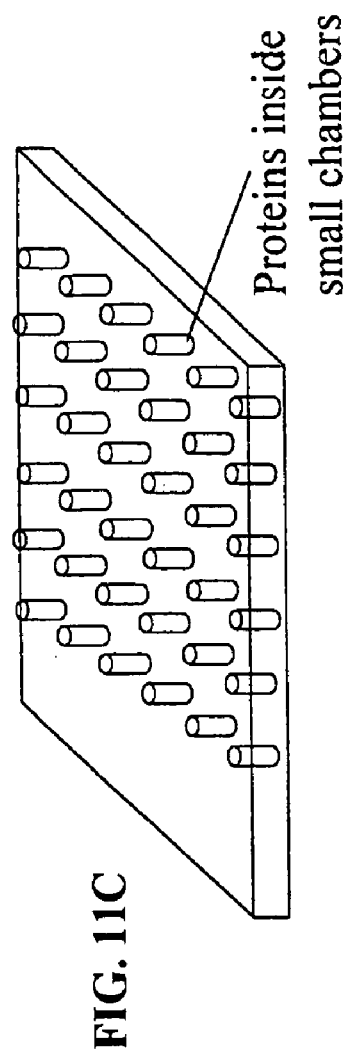
Figure 11A:
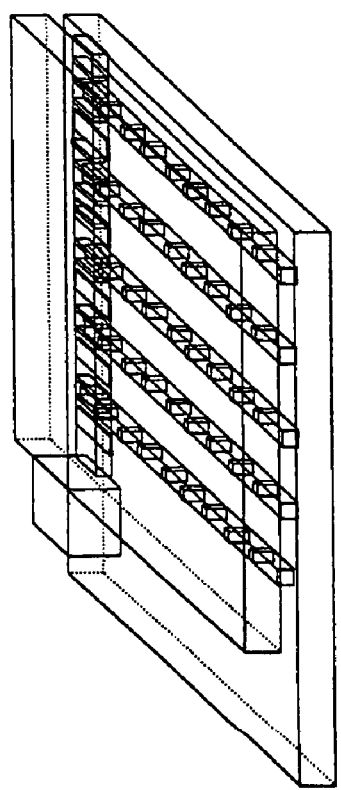

As shown in FIGS. 11A to 11C, the protein arrays shown in FIG. 11A, can be further either dried out for direct biological-reaction process as shown in FIG. 11B. Alternatively, as shown in FIG. 11C, the protein array is processed by a vacuum device to suck the chip from bottom to force each protein pieces into one small chamber, and then brought contact with the micro stamp for filling process. The protein sample preparation processes as shown above can separate and prepare protein samples more than 10,000 samples in very short time, e.g., within an hour, instead tiring and costly routine process which may cost more than 1 hour/per sample. The new process is to achieve sample separation into individual micro liquid slug by taking advantage of weight and surface tension differences between different protein samples such that the separation is carried out with least human intervention.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A micro-stamp array supported on a substrate comprising a plurality of micro-stamp sticks wherein:
   each of said micro-stamp sticks comprising a micro-stamp-stick head having a channel opened through a central portion in each of said micro-stamp sticks;
   each of said micro-stamp-stick heads is attached to a corresponding tapered guide tube surrounded by a tapered guide-tube wall; wherein each said tapered guide tube is in hydraulic communication with a micro-stamp-head channel; and
   a filler chip comprising a plurality of filler reservoirs disposed on top of said tapered guide tubes, each of said filler reservoirs having a refill channel opened to said tapered guide tubes for refilling said tapered guide tubes and said micro-stamp-head channels.

2. The micro-stamp array of claim 1 wherein:
   each of the micro-stamp-head channels is further sealed with a breakable membrane.

3. The micro-stamp array of claim 1 wherein:
   each of the micro-stamp-head channels in hydraulic communication with said corresponding tapered guide tubes contains a liquid biological sample therein in a liquid equilibrium state.

4. The micro-stamp array of claim 1 wherein:
   each of the micro-stamp-sticks is composed of a cured silicon rubber.

5. The micro-stamp array of claim 1 wherein:
   each of the micro-stamp-sticks have a diameter size ranging from tens to hundreds of micrometers.

6. The micro-stamp array of claim 1 wherein:
   said tapered guide tubes are supported in a silicon substrate.

7. The micro-stamp array of claim 2 wherein:
   said guide tubes are supported in a silicon substrate and bonded to said filler chip.

8. The micro-stamp array of claim 7 wherein:
   said filler chip further comprises a plurality of primary refilling reservoirs, each including a micro-refilling channel formed with a RIE etching and said filler chip further comprises a plurality of secondary refilling reservoirs hydraulically communicating with said micro refilling channels and said tapered guide tubes.

9. The micro-stamp array of claim 8 wherein:
   said primary refilling reservoirs are formed in a glass substrate.

10. The micro-stamp array of claim 8 wherein:
    said secondary refilling reservoirs are formed in a cured silicon rubber substrate.

* * * * *